Sept. 29, 1959 R. W. SONNENFELDT 2,906,946
TIME OR PHASE MEASURING SYSTEM
Filed Feb. 28, 1955 6 Sheets-Sheet 2

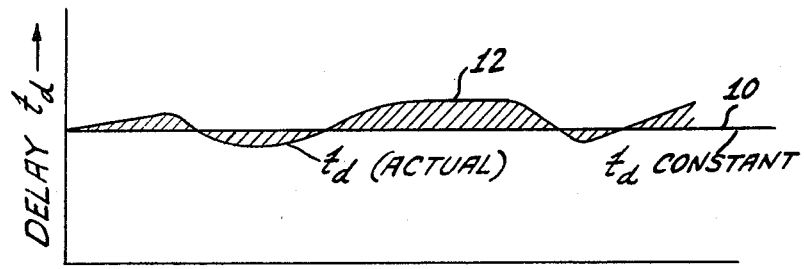
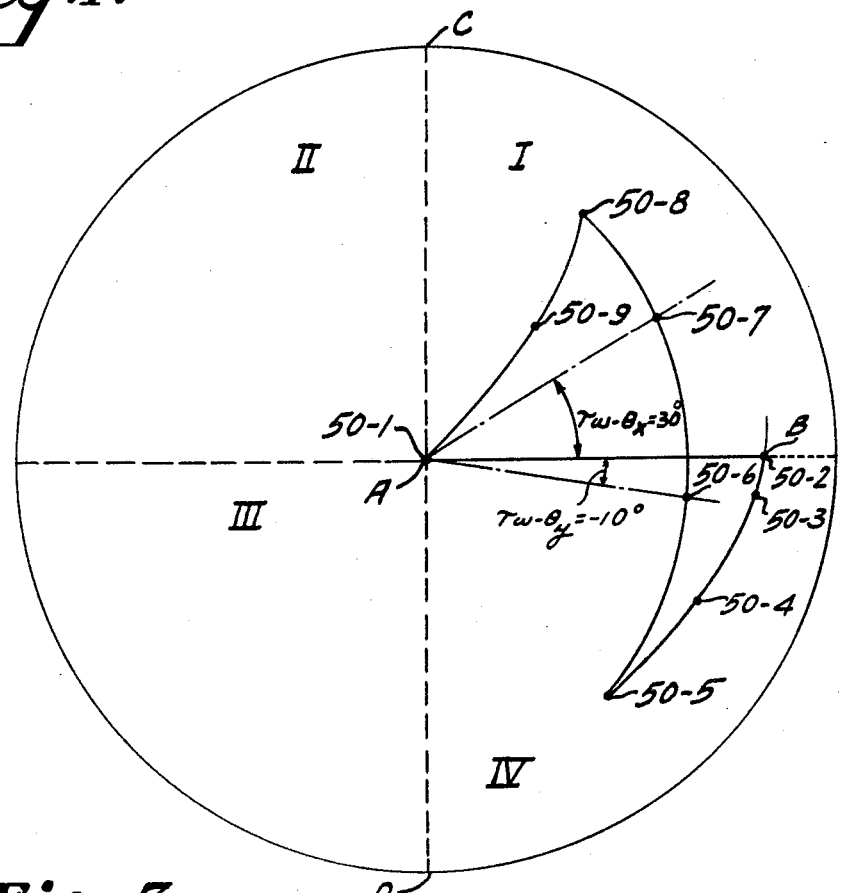

INVENTOR.
RICHARD W. SONNENFELDT
BY
ATTORNEY

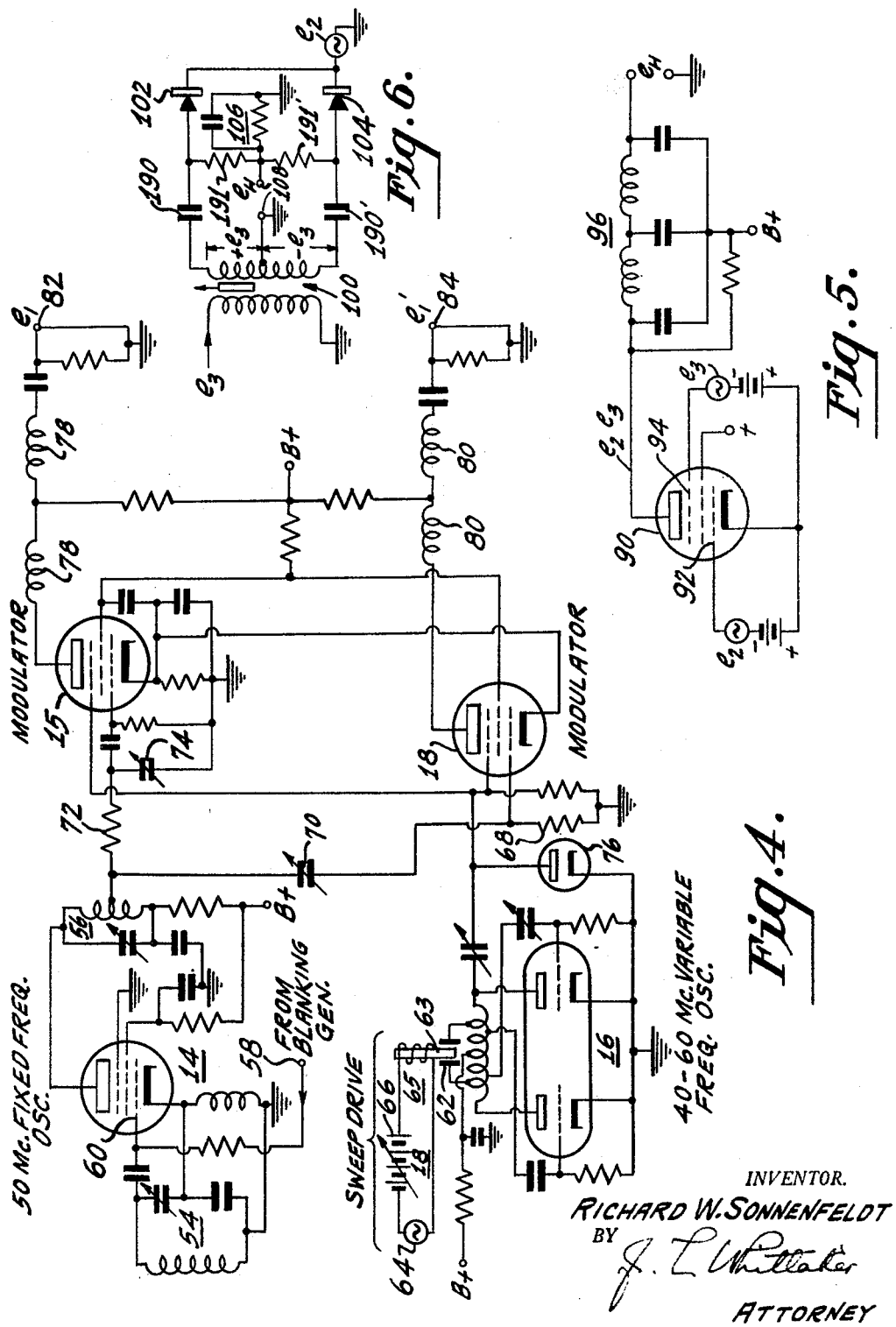

Sept. 29, 1959 R. W. SONNENFELDT 2,906,946
TIME OR PHASE MEASURING SYSTEM
Filed Feb. 28, 1955 6 Sheets-Sheet 5

INVENTOR.
RICHARD W. SONNENFELDT
BY
ATTORNEY

Sept. 29, 1959     R. W. SONNENFELDT     2,906,946
TIME OR PHASE MEASURING SYSTEM
Filed Feb. 28, 1955     6 Sheets-Sheet 6
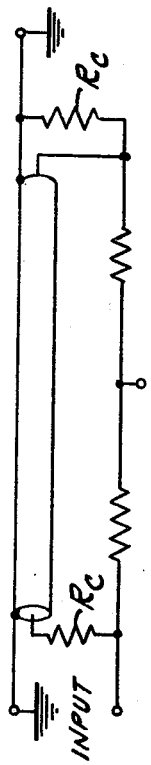
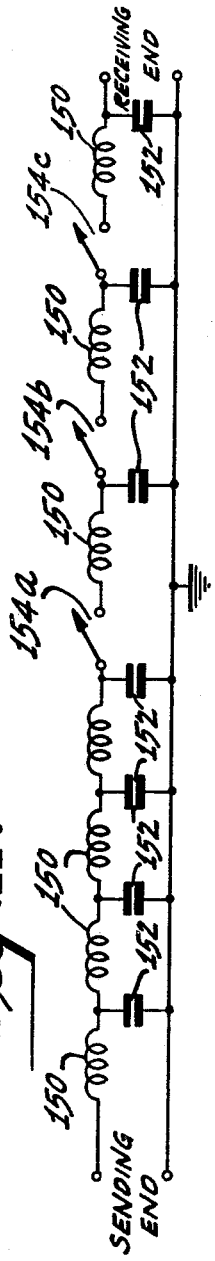
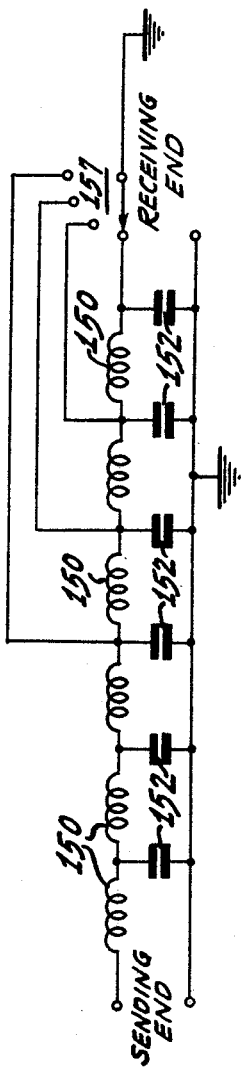
INVENTOR.
RICHARD W. SONNENFELDT
BY
*J. L. Whittaker*
ATTORNEY United States Patent Office 2,906,946
Patented Sept. 29, 1959

2,906,946

TIME OR PHASE MEASURING SYSTEM

Richard W. Sonnenfeldt, Haddonfield, N.J., assignor to Radio Corporation of America, a corporation of Delaware Application February 28, 1955, Serial No. 490,825

13 Claims. (Cl. 324—57)

The present invention relates to an improved system for measuring and/or indicating relative time delay or phase of electrical signals, and in particular, but not necessarily exclusively, to an improved apparatus for measuring the deviations from constant time delay imparted by a network to signals of different frequencies.

To avoid phase distortion, the delay introduced by any circuit in a wave transmission path must be the same for all frequency components of the wave. In many electronic applications and in particular in both black-and-white and color television systems it is important to reduce such distortions to the lowest possible value. Distortions of even one-millionth of a second or less in such systems produce undesirable and in many cases intolerable blurring of the television image.

It is a general object of the present invention to provide an improved system for indicating departures from phase linearity produced by a network.

It is another object of the present invention to provide an improved system for displaying in polar form the angles of such departures from phase linearity.

Another object of the invention is to provide a system of the above type in which deviations from phase linearity introduced by a network to the entire input frequency band may simultaneously be displayed.

Another object of the present invention is to provide an improved system for displaying departures from linear phase delay provided by a network in which the frequencies displayed are indicated by electronically derived index markings.

Another object of the invention is to provide an improved system for generating frequency markers at accurately spaced frequency intervals.

Another object of the invention is to provide an improved system for generating markers of the above type, which are especially suitable for display on a visual display device such as a cathode ray tube indicator.

A further object of the present invention is to provide a highly accurate marker signal generator especially suitable for use in conjunction with a swept frequency oscillator.

According to the invention, a signal wave such as one which is swept in frequency between upper and lower frequency limits is applied to the network under test. The same wave is applied to a first reference network of the type which provides constant time delay within the swept frequency band. The wave is also phase shifted 90° and applied to a second reference network also of the type which provides uniform time delay within the swept frequency band. The outputs of the first reference network and the network under test are multiplied together and then filtered to remove the higher frequency components of the resultant wave. In a similar manner the outputs of the second reference network and the network under test are multiplied together and then filtered to remove the higher frequency components of the resultant wave.

The two filtered waves are employed to separately deflect the cathode ray beam of a cathode ray tube indicator along different coordinates of the indicator screen. The display thus produced indicates the time delay characteristics of the network under test. At the frequencies the network imparts uniform time delay, the display is a straight line and at other frequencies the electron beam is deflected above or below the straight line. The angle made by the deflected beam with respect to its quiescent position and the above-mentioned straight line is the departure from phase linearity introduced by the network.

In a preferred form of the invention a special type of marker generator is employed to intensity modulate the cathode ray beam at different, spaced frequencies within the frequency band of interest. Its circuit includes a delay line which may be short-circuited, open-circuited or terminated at both ends in its characteristic impedance. In the first two cases the input wave which is swept in frequency is applied to the sending end of the delay line and the output is taken from the sending end of the delay line. The output wave includes voltage nodes spaced in frequency from one another. These are used to produce the reference markers.

When a delay line terminated at both ends in its characteristic impedance is employed, the output is taken from a high impedance network such as a voltage divider extending between the sending and receiving ends of the network.

The invention will be described in greater detail by reference to the following description taken in connection with the accompanying drawing in which:

Figure 1 is a graph of the delay characteristic of a typical network to be tested.

Figure 3 is a diagram of a typical display of the present invention;

Figure 4 is a schematic circuit diagram of the variable sweep generator system shown in block form in Figure 2;

Figure 5 is a schematic circuit diagram of a multiplying circuit and filter shown in block form in Figure 2;

Figure 6 is a schematic circuit diagram of another type of multiplying circuit and filter which may be used in the embodiment of the invention shown in Figure 2;

Figures 9–12 are illustrations of different types of delay lines which may be employed with the marker generator in Figure 7.

In the figures similar reference numerals refer to similar elements.

Figure 1 is a graph of the performance of a typical network it is desired to test. Line 10 indicates the desired performance of the network, that is, a uniform time delay over the input frequency band, and line 12 designates the actual performance of the network. The dashed areas are the departures from constant time delay imparted by the network as a function of frequency.

Figure 2:
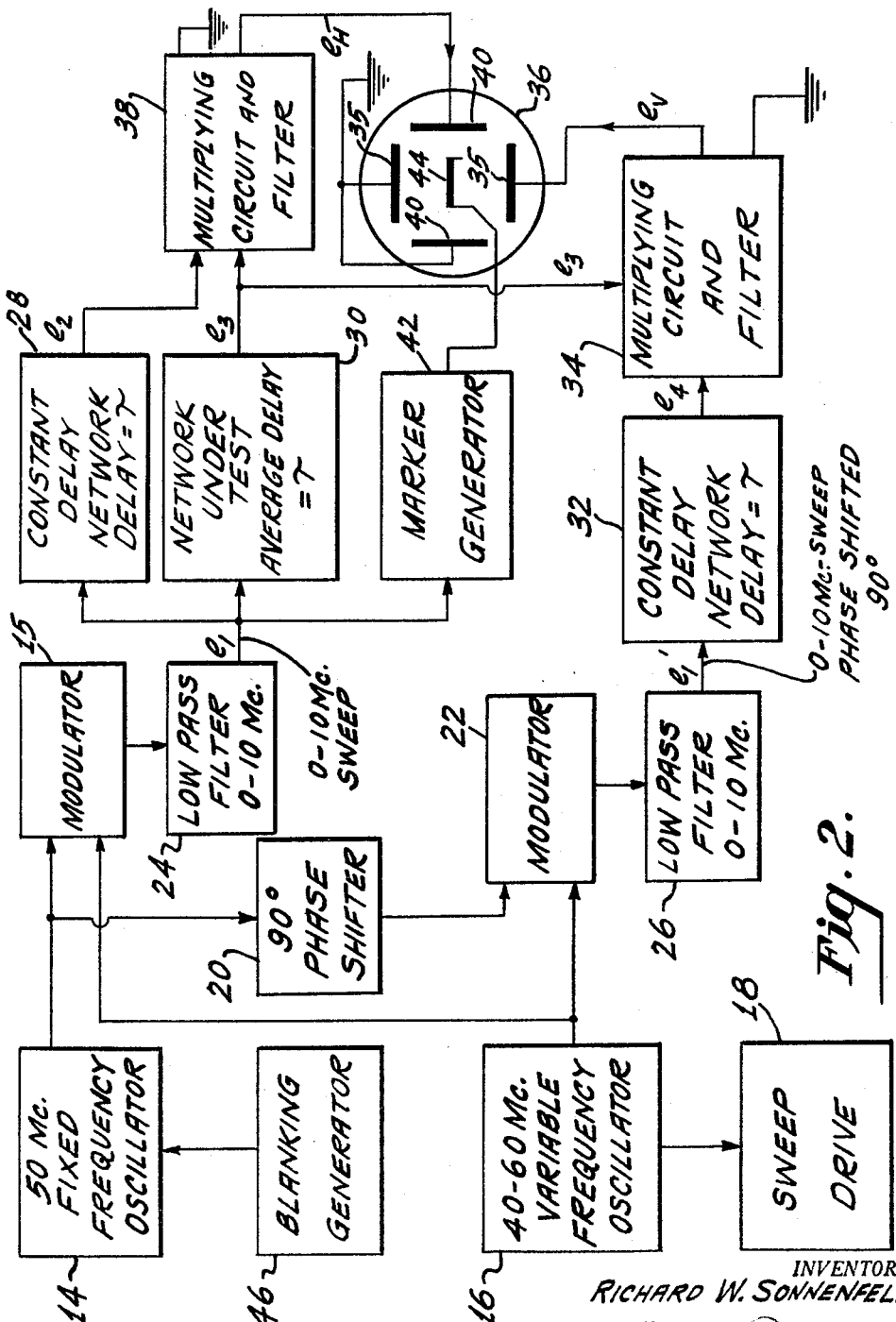
Figure 2 is a block circuit diagram of a typical embodiment in the present invention.

Figure 2 is a block diagram of a typical embodiment of the present invention. Fixed frequency oscillator 14 produces a 50 mc. wave which is mixed in modulator stage 15 with a second wave from oscillator 16. Oscillator 16 is a variable frequency oscillator and is swept in frequency from 40 to 60 mc. by means of a sweep drive 18. The latter may be electrical or mechanical. The 50 mc. fixed frequency wave is also phase shifted 90° by phase shifter 20 and the phase-shifted wave combined with the swept frequency wave in modulator stage 22. The outputs of modulators 15 and 22 are passed through low-pass filter stages 24 and 26 respectively to obtain resultant waves $e_1$ and $e_1'$.

Wave $e_1$ is applied to delay network 28 which may be thought of as a reference network since it imparts a constant delay $\tau$ to the entire input frequency band. Wave $e_1$ is also applied to the network under test. The delay of the constant delay network is adjustable and in a preferred form of the invention is adjusted to the average delay of the network under test. In a similar manner the phase-shifted 0–10 mc. sweep $e_1'$ is applied to a second constant delay network 32 which is similar to network 28 and which also imparts a delay $\tau$ to the input wave over the entire input frequency band.

One method of obtaining constant time delay from network 28 (and also from network 32) is to design the network for a much wider bandwidth than needed. For example, a constant $k$ network designed for a bandwidth of 30 mc. provides very nearly constant delay over a bandwidth of 10 mc. This is even truer for more elaborate networks employing bridging or other means of phase correction. In other forms of the invention so-called "compensated delay lines" such as shown in Kallmann Patent No. 2,461,061, issued February 8, 1949, or Finch et al. Patent No. 2,416,683, issued March 4, 1947, may be employed for networks 28 and 32.

The output wave $e_4$ of delay network 32 is mixed with the output wave $e_3$ of the network under test by a multiplying circuit 34. The latter may be a multigrid electron tube connected as a modulator or may be a phase sensitive detector. Details will be given below. The product wave $e_3e_4$ is then filtered by a low-pass filter in block 34 in order to remove the higher frequency components of the product wave. The resultant voltage $e_V$ is applied to the vertical deflection plates 35 of a cathode ray tube indicator 36.

In a similar manner output waves $e_2$ and $e_3$ of constant time delay network 28 and the network under test 30 respectively are multiplied and filtered by stage 38 which is substantially identical with stage 34. The resultant filtered wave $e_H$ is applied to the horizontal deflection plates 40 of the cathode ray tube indicator 36.

Marker generator 42 which is connected to the 0–10 mc. sweep output of low-pass filter 24 provides electronic index marks indicative of the frequencies displayed. Details of stage 42 will be given below. The index markers are applied to cathode 44 of the indicator and intensity modulate the electron beam.

Blanking generator 46 functions to periodically deactivate the 50 mc. fixed frequency oscillator 14. The blanking generator may, for example, consist merely of a 60-cycle wave applied to the control grid of the oscillator in order to blank the oscillator on alternate half cycles of a 60-cycle wave.

The cathode ray tube indicator 36 is shown in schematic form in Figure 2. It is to be understood, however, that the indicator includes an electron gun for producing an electron beam, a control grid, and focusing and accelerating electrodes for focusing the beam so as to produce an intense spot on the screen of the indicator. In its quiescent position the beam is preferably centered on the screen. The beam intensity may be controlled by the control grid (not shown). Although the indicator shown employs electrostatic deflection means, it will be understood by those skilled in the art that an electromagnetic type of indicator may be employed instead. The above-mentioned details of the cathode ray tube indicator are conventional and well known by those skilled in the art and therefore need not be discussed in greater detail.

The mode of operation of the circuit shown in Figure 2 may be best understood by reference to the brief mathematical analysis which follows.

The output of low-pass filter 24 is a sinusoidal wave which is periodically swept in frequency from 10 mc. to zero and then from zero to 10 mc. as shown in Fig. 8a. This sinusoidal wave $e_1$ may be defined by the following expression $$e_1 = E_1 \sin(\omega t + \phi_1) \quad (1)$$

where:

$E_1$ is the maximum amplitude of the wave,
$t$ = time
$\omega$ = angular frequency, and
$\phi_1$ = phase angle.

Wave $e_1$ is applied both to the constant delay network 28 and the network under test 30. The output wave $e_3$ of the network under test may be defined by the expression $$e_3 = E_3 \sin(\omega t + \phi_3) \quad (2)$$

Similarly the output wave $e_2$ of constant delay network 28 is given by the expression $$e_2 = E_2 \sin(\omega t + \phi_2) \quad (3)$$

where: $\phi_2$ and $\phi_3$ are the respective phase angles of the output waves $e_2$ and $e_3$.

Voltages $e_2$ and $e_3$ are multiplied together in stage 38 to obtain the product voltage $e_2e_3$ as follows:

$$e_2e_3 = E_2E_3 \sin(\omega t + \phi_2)\sin(\omega t + \phi_3) \quad (4)$$

Using trigonometric identities, Equation 4 can be placed in the following form $$e_2e_3 = \tfrac{1}{2}E_2E_3[\cos(\phi_2-\phi_3) - \cos(2\omega t + \phi_3 + \phi_2)] \quad (5)$$

The low-pass filter of stage 38 eliminates the term of frequency $2\omega t$ and Equation 5 reduces to the following:

$$e_2e_3 = \tfrac{1}{2}E_2E_3\cos(\phi_2-\phi_3) \quad (6)$$

The phase shifts $\theta_2$ and $\theta_3$ produced in networks 28 and 30 respectively are given by the expressions $$\theta_2 = \phi_2 - \phi_1 \quad (7)$$

and $$\theta_3 = \phi_3 - \phi_1 \quad (8)$$

Since wave $e_1$ is applied in the same phase to both networks, we can, for the purposes of analysis, assign any arbitrary value to $\phi_1$. We will assume that $\phi_1 = 0$ and this permits us to substitute Equations 7 and 8 in Equation 6 to obtain the following $$e_2e_3 = \tfrac{1}{2}E_2E_3\cos(\theta_2-\theta_3) \quad (9)$$

This can also be written in the form $$e_2e_3 = k_1E_3\cos(\theta_2-\theta_3) \quad (10)$$

where: $k_1$ is a constant, since $\tfrac{1}{2}E_2$ is, in fact, a constant. In this connection it should be noted that $E_3$ is determined by the amplitude characteristics of the network under test 30 and so becomes a function of $\omega$. In general, network 30 is not necessarily an all-pass network and $E_3 \neq k$.

Constant delay network 28 imparts a uniform delay $\tau$ to input wave $e_1$ over the entire 0–10 mc. frequency input band. The time delay imparted by a network at an angular frequency $\omega$ is by definition $$t_{d(\omega)} = \theta/\omega \quad (11)$$

where: $\theta$ is the phase shift.

As stated above, the delay imparted by network 28 is a constant $\tau$ and therefore Equation 11 may be rewritten in this particular case as $$\theta_2 = \tau\omega \quad (12)$$

Substituting Equation 12 in Equation 10 gives the following:

$$e_2e_3 = e_H = k_1E_3\cos(\tau\omega - \phi_3) \quad (13)$$

The phase-shifted 0–10 mc. sweep $e_1'$ may be defined by the expression $$e_1' = E_1'\cos(\omega t + \theta_1) \quad (14)$$

The output voltage of network 32 is $$e_4 = E_4\cos(\omega t + \theta_4) \quad (15)$$

Stage 34 multiplies voltage $e_4$ by $e_3$ to obtain $$e_3e_4=E_3E_4\cos(\omega t+\theta_4)\sin(\omega t+\theta_3) \qquad (16)$$

which reduces to $$e_3e_4=\tfrac{1}{2}E_3E_4[\sin(\theta_4-\theta_3)+\sin(2\omega t+\theta_3+\theta_4)] \qquad (17)$$

As in the case of the wave defined by Equation 5, product wave $e_3e_4$ is passed through a low-pass filter (part of stage 34) and the term of frequency $2\omega t$ disappears. Equation 17 then becomes $$e_3e_4=\tfrac{1}{2}E_3E_4\sin(\theta_4-\theta_3) \qquad (18)$$

which can also be written, when $\theta_1=0$, as:

$$e_3e_4=\tfrac{1}{2}E_3E_4\sin(\theta_4-\theta_3)=\tfrac{1}{2}k_2E_3\sin(\theta_4-\theta_3) \qquad (19)$$

where $k_2$ is a constant.

By definition $$\theta_4=\tau\omega \qquad (20)$$

Substituting Equation 20 in Equation 19 gives $$e_2e_4=e_V=k_2E_3\sin(\tau\omega-\theta_3) \qquad (21)$$

Summarizing the above briefly, the resultant waves which are applied to the horizontal and vertical deflection means of the cathode ray tube indicator are $$e_H=k_1E_3\cos(\tau\omega-\theta_3) \qquad (13)$$

and $$e_V=k_2E_3\sin(\tau\omega-\theta_3) \qquad (21)$$

so that the variable $$e_H+je_V=E_3[k_1\cos(\tau\omega-\theta_3)+k_2\sin(\tau\omega-\theta_3)]$$

is displayed. With $k_1=k_2$ this is the complex variable $$E_3k_1\epsilon^{-(\tau\omega-\theta_3)}.$$

The significance of the display of Figure 3 may now be seen. Suppose, for example, that the network under test 30 imparts a constant time delay $\tau$ to the input wave $e_1$. In such case $\theta_3=\tau\omega$, Equation 13 reduce to $e_H=k_1E_3$ and Equation 21 reduces to $e_V=0$. Thus, the resultant display will be a horizontal line as shown by the portion AB of the display. If, at some frequency within the band, the departure from phase linearity imparted by network 30 is 90°, that is, if $\tau\omega-\theta_3=90°$, $e_H$ will equal zero and $e_V$ will equal $k_2E_3$. The resultant display would be, in this case, a vertical line beginning at point A (Fig. 3) and extending in an upward direction along dashed line AC. In a similar manner, if the departure from phase linearity $\tau\omega-\theta_3$ is some angle between zero and +90°, the deflected electron beam will fall somewhere within quadrant I; if the departure from phase linearity is between zero and —90°, the beam will be deflected somewhere into quadrant IV (Fig. 3). It is also clear that departures from phase linearity of from 90° to 180° will cause a display in quadrant II and departures in phase linearity from +180° to +270° will cause a display in quadrant III.

The system outlined above has general applicability. In the equations developed the terms $e_1$, $e_2$, etc. are in the form of voltages; however, it should be appreciated that they may actually represent any quantity. For example, they may represent currents, velocities, amplitudes or similar quantities. Moreover, the input and output signals need not be similar; one can be a current and the other a voltage, etc.

The network to be tested can be any type of network. For example, the network may consist of a lossy circuit in which case a preamplifier stage may be added in series with it. In such case the delay of the reference networks would be adjusted to the average delay of the series circuit. The network to be tested may consist of a transistor, certain parameters of which it is desired to determine. In this connection, the invention has been found especially useful in the measurement of input and output impedances over entire frequency bands of interest. Finally, the network to be tested may also include, if required, test equipment such as a high gain, low capacitance probe amplifier to avoid loading the tested element.

Figure 3 illustrates a display produced by a typical network under test. The intensified marks 50–1 to 50–9 are the frequency markers. In a typical embodiment of the invention these were spaced from one another 500 kc. The display shows that at a frequency indicated by marker 50–7 the departure from phase linearity $\tau\omega-\theta_x$ is approximately 30° and at a second frequency indicated by marker 50–6 the departure from phase linearity $\tau\omega-\theta_y$ is about —10°. At other frequencies, indicated by other markers, $\tau\omega-\theta$ is equal to other values.

Although not shown in Figure 3, if desired, a transparent, radially lined grid marked off in angles may be superimposed on the oscilloscope screen to facilitate reading of the display. Also, the center A of the display may be moved closer to the edge of the screen in specific instances to facilitate reading the display. For example, if the maximum values of $\tau\omega-\theta_3$ are $\leq+90°$, the center A of the display may be moved closer to the left edge of the screen and the display expanded to cover a greater screen area.

Details of a typical variable sweep oscillator system are shown in Figure 4. Fixed frequency oscillator 14 has its tuned grid circuit 54 tuned to 25 mc. and its tuned plate circuit 56 tuned to the second harmonic 50 mc. The blanking voltage from terminal 58 is applied to control grid 60 of the fixed frequency oscillator and serves to cut off the oscillator on alternate half cycles. The blanking voltage is preferably a square wave or other wave with steep sides. The oscillator is periodically blanked to obtain a zero reference which generates the central reference marker in the CRT display (marker 50–1 of Fig. 3). It will be understood that if the central marker is not required, the blanking generator may be omitted. Since the oscillator is in other respects conventional it is believed to be unnecessary to give further details of its mode of operation.

Oscillator 14 is swept in frequency over the 40 to 60 mc. band. The sweep drive means of the oscillator is electromechanical and includes a source of alternating current 64, a source of direct current 66, and solenoid 65. Both current sources are adjustable in a preferred form of the invention.

The alternating current cyclically drives solenoid armature 63 between the fixed plates of capacitor 62 to vary the effective capacitance introduced by the latter. Since capacitance 62 is the lumped capacitive element of the tuned plate circuit of oscillator 16, variations in its value cause variations in the output frequency of said oscillator.

The magnitude of the direct current determines the center frequency of the swept frequency band. This permits one to short out the alternating current source, whereby the wave applied to the respective constant delay networks and the network under test consists of a single frequency rather than a swept band of frequencies.

The amplitude of the alternating current wave supplied by source 64, which may be a 60-cycle source, determines the extent of frequency deviation of the variable sweep oscillator 16. As shown in Fig. 4, in one form of the invention oscillator 16 is continuously varied in frequency from 40–60 mc. and then back from 60–40 mc., etc. The resultant swept wave varies from 10 mc. to 0 (50 mc. minus 40 mc. to 50 mc. minus 50 mc.) and then back from 0 to 10 mc. (50 mc. minus 50 mc. to 60 mc. minus 50 mc.). Alternate cycles (one cycle=10 mc. to 0 to 10 mc.) of this wave are blanked by generator 46 (Figs. 2 and 4) and the resultant wave is as shown in Fig. 8a.

It is to be understood that the invention is not limited to the specific type of drive means shown for sweeping the variable frequency oscillator over a given frequency band. Thus, it will be apparent to those skilled in the art that the frequency output of the oscillator could be varied solely by mechanical means such as a motor. In a typical arrangement of this type, the motor drives the movable plates of a variable capacitor so as to continually vary its capacitance in a manner dependent on the plate shapes and motor frequency. In a similar manner, the oscillator may be made variable by continuously electrically or mechanically varying the inductance of the tuned frequency determining circuit of the oscillator.

The output of the fixed frequency oscillator 14 is shifted 45° in one direction by the resistor capacitor combination 68, 70 and is shifted 45° in the opposite direction by the resistor capacitor combination 72, 74. Capacitors 70 and 74 are variable and are adjusted to produce precise frequency shifts of +45° and −45° respectively at the 50 mc. output frequency of oscillator 14. Modulators 16 and 18 are linear modulators with low impedance outputs. In an embodiment of the invention actually constructed, the modulators comprised type 6AS6 tubes. The suppressor grids of the modulators are clamped by diode 76 to prevent them from being driven positive. The outputs of the modulators include the sum and difference frequencies and carrier frequencies of the fixed and variable frequency oscillators. The sum and carrier frequency components of the output wave are suppressed by radio frequency chokes 78 and 80 of the respective output circuits of modulators 15 and 18. These correspond to low-pass filters 24 and 26 of Figure 2. Outputs $e_1$ and $e_1'$ are available at output terminals 82 and 84 of the sweep frequency system.

As mentioned above, the modulator tubes have low impedance outputs. If larger sweep outputs are required, the modulators may be provided with higher load impedances and may then be followed by coupling cathode follower stages. Care must be taken, however, to maintain the impedances in the two sweep channels identical to preserve the 90° phase relationship of output waves $e_1$ and $e_1'$ over the entire sweep range.

Some typical multiplying and filter circuits which may be used for blocks 34 and 38 are shown in Figs. 5 and 6. Since both are similar only the circuit of block 38 is shown.

Figure 5 illustrates a suppressor grid modulator similar to the one shown in Fig. 4 which includes a pentode 90 to the control grid 92 of which is applied wave $e_2$ and to the suppressor grid 94 of which is applied wave $e_3$. The tube is biased to operate linearly so that it multiplies input voltages $e_2$ and $e_3$ to produce product voltage $e_2e_3$. Low-pass filter 96 is a conventional condenser input type L-C filter and it by-passes the higher frequency components (the term of frequency $2\omega t$ of the product wave). The resultant output voltage $e_H$ is the one defined by Equation 13 discussed above.

A balanced phase detector such as illustrated in Figure 6 may be employed instead of the circuit shown in Figure 5. (The circuit may also be employed instead of the one shown in Fig. 4 for stages 15 and 18.) One of the input voltages $e_3$ is applied to the circuit at the primary winding of transformer 100. The other of the voltages $e_2$ is applied to the common cathode-anode connection of diodes 102, 104. The resultant product wave $e_2e_3$ is filtered by a conventional low-pass R-C filter 106 which by-passes the higher frequency components of the product wave $e_2e_3$. Output voltage $e_H$ is available at terminals 108. For optimum performance $e_3$ should be much greater than $e_2$, preferably on the order of 5 to 1, to allow for selectivity in attenuation in the network under test. A phase splitter can be used instead of the transformer 100 and is preferable for wider bandwidths.

In the circuit of Fig. 6, condenser 190 is equal in value to condenser 190' and resistor 191 is equal in value to resistor 191'. The time constants $C_{190}R_{191}=C_{190'}R_{191'}$ are sufficiently long so that both diodes 102 and 104 act as peak detectors and charge condensers 190 and 190' to the peak values of voltage applied to said diodes. The secondary winding of transformer 100 is arranged to deliver voltage $+e_3$ to the plate of diode 102 and $-e_3$ to the cathode of diode 104. It will be understood by those skilled in the art that with the relative values of circuit components as indicated the output is the required product wave $e_H$.

Figure 7:
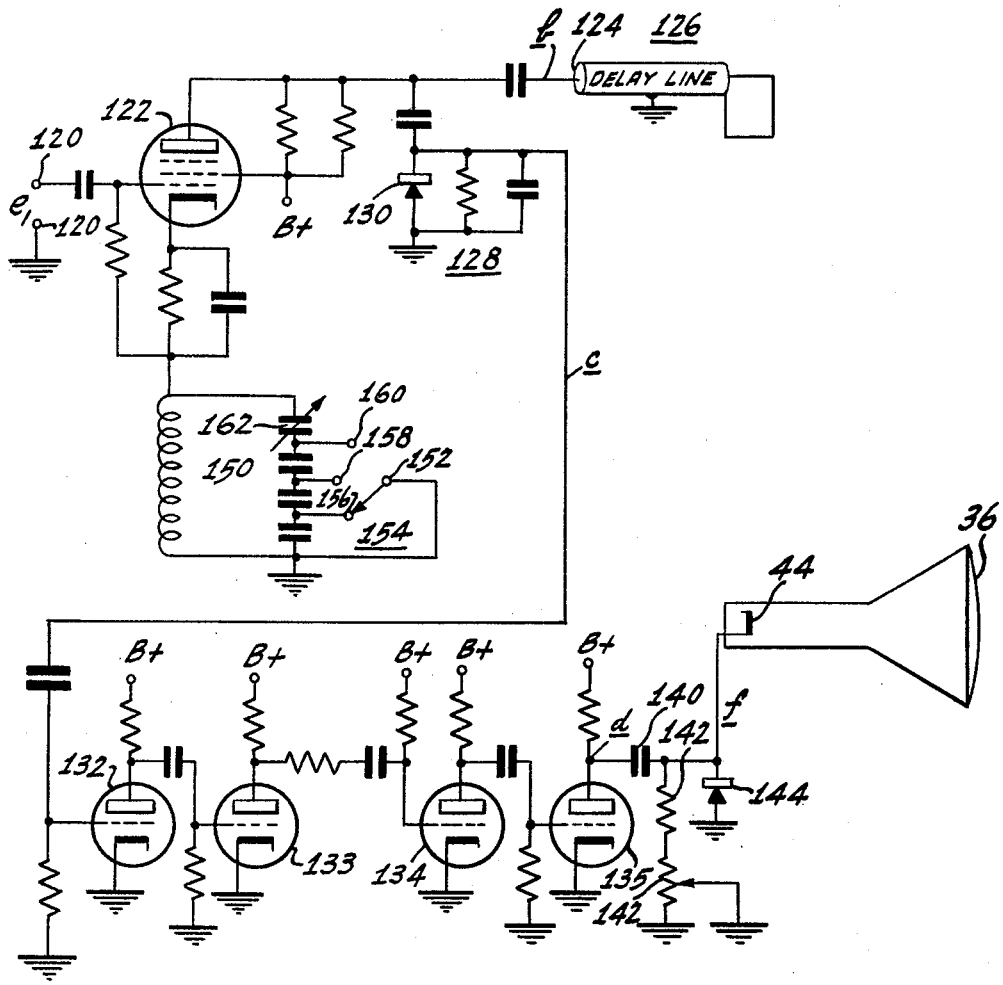
Figure 7 is a schematic circuit diagram of a marker circuit especially adapted for use in the present invention.

Figure 7 illustrates a preferred marker generator circuit especially adapted for use in the tester of the invention. The swept input wave $e_1$ is applied to the input terminals 120 of the circuit and thence to the control grid of input amplifier 122. The amplified wave is applied to the sending end 124 of delay line 126. The delay line is terminated at its receiving end in a short circuit so that the waves transmitted down the line are reflected back toward the sending end thereof. The delay line preferably provides uniform delay to the entire input frequency band, that is, to the entire frequency band from zero to 10 mc. It may be of the "compensated" type as described above in connection with Fig. 2 or any other type of constant delay line. The resultant wave at sending end 124 of the delay line will consist of reinforced portions and cancelled, that is, nodal or null portions, the latter occurring at the frequencies the reflected wave is 180° out of phase with the applied wave. The resultant wave $b$ at the sending end of the delay line and other waves to be discussed below are illustrated in Figure 8.

Figure 8:
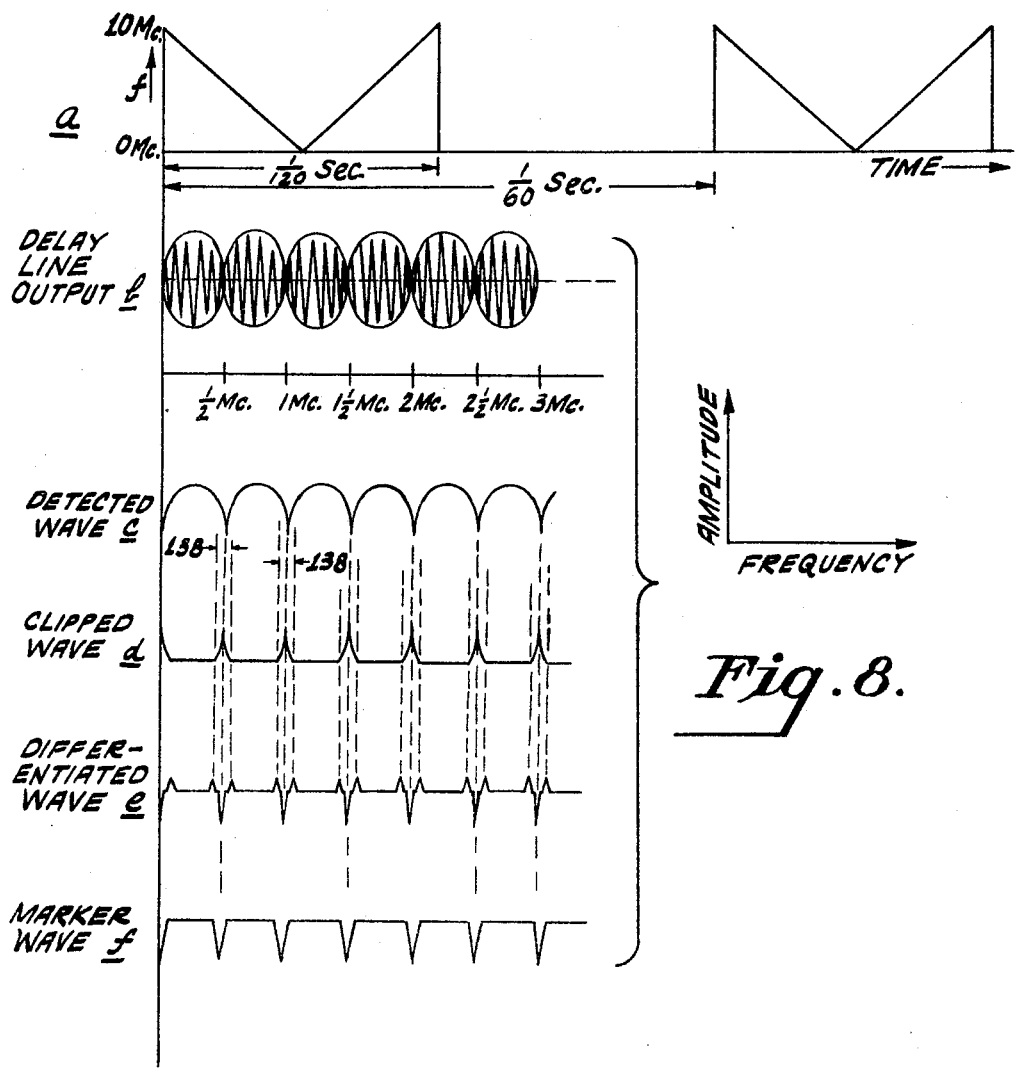
Figure 8 is a drawing of the waveforms at various portions of the circuit shown in Figure 7.

Referring briefly to Figure 8, the first waveform $a$ is plotted on a time vs. frequency scale. It is the swept frequency wave $e_1$ applied to terminals 120 of Figure 7. The remaining waveforms $b$–$f$ inclusive are plotted on an amplitude vs. frequency scale.

Returning to Figure 7, wave $b$ is detected by detector circuit 128 including diode 130. Although in the embodiment of the invention built a diode 130 was employed, it will be appreciated by those skilled in the art that this stage may be omitted if the first of amplifiers 132–135 inclusive is a non-linear device so that it detects. Detected wave $c$ is shown in Fig. 8.

Amplifiers 132–135 inclusive are operated so that they amplify only the null portions 138 (see Fig. 8c) of the input wave. The resultant wave $d$ at the anode of the last stage 135 is shown in Fig. 8d. Circuit 140, 142 is an R-C differentiator circuit and produces from wave $d$ the differentiated wave $e$ which consists of positive-going and negative-going pulses. The positive-going portions of the differentiated wave are eliminated by diode 144 and the resultant marker pulses $f$ applied to the cathode 44 of the cathode ray tube indicator 36 to intensify the beam. It will be appreciated that the negative-going pulses may be applied to an inverter stage such as a triode (not shown) in order to invert the pulses and these positive-going pulses then applied to the control grid (not shown) of the CRT to intensity modulate the beam.

The spacing of marker pulses $f$ is a direct function of the effective length of delay line 126. In an embodiment of the invention actually constructed the length of the line was chosen to provide markers spaced 500 kc. from one another. However, in other types of circuits these may be closer or further from one another as required.

Although the circuit illustrated in Figure 7 employs a short-circuited delay line, if desired, an open-circuited line such as shown in Figure 9 or one terminated at both ends in its characteristic impedance $R_c$ as shown in Figure 10 may be employed instead. The advantage of the short-circuited line is that the marker immediately adjacent the zero reference point is spaced in frequency therefrom the same amount as the remaining markers are spaced from one another. On the other hand, if an open-circuited line is employed, the first nodal point is spaced from the zero reference point an amount which is half the spacing between the remaining pulses. This last is also true of the delay line illustrated in Figure 10.

The above phenomena may be explained in terms of wavelengths. In the case of a short-circuited line, as the frequency of the wave increases the line appears to have different lengths to the different frequency components of the waves. At some given wave frequency (which one is determined by the line length), the line will appear to be a half wavelength long. At that frequency the reflected wave will be exactly 180° out of phase with the input wave whereby a nodal point is produced. Similarly at a given harmonically related higher wave frequency the line will appear to be one wavelength long, whereby another nodal point is produced. Thus, the first frequency marker is spaced from the zero reference point the same amount as the second marker is spaced from the first marker.

In the case of the open-circuited line, however, the first nodal point occurs at the frequency at which the line appears to be one-quarter wavelength long and not at the frequency the line appears to be one-half wavelength long. Therefore, the first marker occurs at the former frequency. The next nodal point does not occur until the input frequency at which the line appears to be three-quarters of a wavelength long. Thus, the spacing between the zero reference point and the first marker is one-half that of the spacing between the first marker and the second marker. The same situation prevails for the line shown in Figure 10.

It will be noted that the cathode circuit of the input amplifier 122 of Figure 7 includes a tuned circuit 150 which is adjustable in frequency. Thus, moving arm 152 of switch 154 to the different taps 156, 158, 160 inserts different amounts of capacitance in the tuned circuit. Fine adjustment of the capacitance in the tuned circuit is provided by variable capacitor 162. At the frequencies to which tuned circuit 150 is tuned, the cathode circuit presents a high impedance to the input wave and the result is a "hole" or nodal point in wave b. This hole may be used as an interpolation marker. Since the latter may readily be compared with the delay line markers (Figure 8f), accurate calibration of tuned circuit 150 is not needed.

In one form of the invention the external indicator (not shown) for circuit 150 includes a dial with marks thereon to indicate the position of switch 154. A second calibrated dial is mechanically coupled to condenser 162. This last dial is calibrated by comparing the position of the interpolation marker with that of the fixed markers.

In the above embodiment of the marker circuit, the 500 kc. spaced marker dots (Figure 8f) were found to be accurate to about ±25 kc. at 6 mc. with error decreasing essentially linearly with frequency.

In the circuits illustrated in Figures 7, 9, and 10 the delay line employed is a length of coaxial cable. It will be appreciated that other types of delay lines such as distributed parameter delay lines may be employed instead. It is important, however, that the delay line provide uniform delay over the entire input frequency band if it is desired to have frequency markers equally spaced from one another. On the other hand, there may be some applications in which it is desired to have the markers spaced further from or closer to one another in certain frequency regions. In such cases, delay lines may be employed which are non-linear in said frequency regions. For example, if an "uncompensated" delay line is employed, its effective inductance decreases in the frequency region in which the electrical length of the line approaches the wavelength of the applied wave. In this region, therefore, the delay introduced by the line (which is equal to $\sqrt{LC}$) decreases and the frequency markers generated would be spaced further from one another.

The marker generator described above may be made more adaptable to different testing situations by making the delay line variable in length. This may be done in a number of ways. Figures 11 and 12 are two examples. The circuits shown include inductive elements 150 and capacitive elements 152. In the arrangement of Fig. 11 mechanical switches 154A–154C, inclusive, are used to alter the effective length of an open-circuited line. In the arrangement of Fig. 12 switch 157 alters the effective length of a short-circuited line. It will be understood, of course, that the drawings of the delay line in Figures 11 and 12 are merely for purposes of illustration since, as will be understood by those skilled in the art, the delay line normally consists of a number of sections much greater than three or four and moreover, in many types of delay lines the capacitive elements are distributed rather than lumped as shown.

The length of the delay line may also be made variable by employing electronically controllable delay components. Thus, for example, the capacitors may be formed of a dielectric of the type, the dielectric constant of which is variable in response to different values of direct potential applied to the capacitor plates. In another form of the invention, the delay line may be formed with inductive elements which are electronically variable in value. Delay lines of these types are shown in Heath Patent 2,650,350, issued August 25, 1953.

An important advantage of the marker circuit of the present invention over those presently employed is that no tuned circuits (except for the marker circuit 150) are employed in the marker generator. Thus, the bandpass of the circuit is broad and this permits any type of input wave, sinusoidal, square, triangular, or otherwise, to be used as the input swept wave of the circuit. The circuit is also insensitive to harmonic distortion for the same reason.

Another important advantage of the marker circuit in the present invention is the complete absence of "twinkling" effect. The twinkling effect is the variation in amplitude of the marker pulses and is commonly present in marker generator circuits employing beat oscillators. This is because the phase of the waves from the swept and the beat oscillators is arbitrary and when at the same frequency their voltages may either reinforce or cancel, depending on whether they are in or out of phase.

What is claimed is:

1. Apparatus for indicating the departure from constant time delay imparted by a network to an input wave comprising, in combination, first and second reference networks providing a constant time delay to the frequency components of said input wave; means applying said input wave to the network to be tested and the first of said reference networks; means for shifting the phase of said input wave 90°; means for applying said phase-shifted wave to the second of said reference networks; means for multiplying the output of said first network by that of said network under test to obtain a first product wave; means for multiplying the output of said second network by that of said network under test to obtain a second product wave; means for filtering said first and second product waves to eliminate the higher frequency components thereof; and means for indicating said filtered first and second product waves.

2. Apparatus for indicating the departure from constant time delay imparted by a network to an input wave comprising, in combination, first and second reference networks providing a constant time delay to the frequency components of said input wave; means applying said input wave to the network to be tested and the first of said reference networks; means for shifting the phase of said input wave 90°; means for applying said phase-shifted wave to the second of said reference networks; means for multiplying the output of said first network by that of said network under test to obtain a first product wave; means for multiplying the output of said second network by that of said network under test to obtain a second product wave; means for filtering said first and second product waves to eliminate the frequency components thereof higher in value than a given frequency; an indicating means comprising a cathode ray tube indicator including means for producing a focused electron beam on the screen thereof and first and second deflection means for deflecting said beam along different coordinates of said screen, one of said filtered waves being applied to said first deflection means and the other of said filtered waves being applied to said second deflection means.

3. Apparatus as set forth in claim 1 wherein the average time delay imparted by said network being tested is equal to $\tau$ and wherein each of said reference networks provides a constant time delay equal to $\tau$.

4. Apparatus as set forth in claim 2 wherein the average time delay imparted by said network being tested is equal to $\tau$ and wherein each of said reference networks provides a constant time delay equal to $\tau$.

5. Apparatus as set forth in claim 2, further including marker generator means coupled to said cathode ray tube indicator means for intensity modulating said electron beam at different frequencies within the frequency band covered by said input wave.

6. Apparatus for indicating the departure from constant time delay imparted by a network to an input wave comprising, in combination, a source of waves cyclically variable in frequency over a predetermined frequency band; first and second reference networks providing a constant time delay to the frequencies within said band; means applying said wave to the network to be tested and the first of said reference networks; means for shifting the phase of said wave 90°; means for applying said phase-shifted wave to the second of said reference networks; means for multiplying the output of said first network by that of said network under test to obtain a first product wave having high and low frequency components; means for multiplying the output of said second network by that of said network under test to obtain a second product wave having high and low frequency components; means for filtering said first and second product waves to eliminate said higher frequency components thereof; and means for indicating said filtered first and second product waves.

7. Apparatus as set forth in claim 6 wherein said source provides sinusoidal waves.

8. Apparatus as set forth in claim 7, wherein said means for indicating comprises means for visually indicating said filtered waves, and further including marker generator means coupled to said visual indicating means for producing reference markers thereon spaced from one another by given frequency intervals.

9. Apparatus as set forth in claim 8, wherein said marker generator means includes a delay line of predetermined length short-circuited at its receiving end, said delay line being connected to receive at its sending end said cyclically variable sinusoidal waves, whereby there is produced at said sending end of said delay line a resultant wave having null points equally spaced in frequency from one another; and circuit means coupled to said sending end of said delay line for converting said resultant wave to marker pulses equally spaced in frequency from one another.

10. Apparatus for determining the phase delay characteristic of a signal transmission circuit having input and output connection means to signals in a frequency band of interest comprising, in combination, first and second reference signal transmission circuits having linear phase-to-frequency characteristics in said frequency band of interest, each said reference signal transmission circuit having an input and output connection means; a source of sinusoidal signals cyclically variable in frequency over said entire frequency band coupled to the input connection means of one of said reference circuits and the input connection means of a signal transmission circuit to be tested; phase-shifting means coupled to said source of signals for shifting the phase thereof 90°, the output of said phase-shifting means being applied to the input connection means of said second reference signal transmission circuit; multiplying means connected to the output connection means of the signal transmission circuit to be tested and the output connection means of said first reference transmission circuit for multiplying the outputs of two circuits to obtain a first product wave having low and high frequency components; multiplying means connected to the output connection means of said second transmission circuit and the signal transmission circuit to be tested for multiplying the outputs of said two circuits to obtain a second product wave having low and high frequency components; means connected to receive said product waves for removing the higher frequency components thereof; and means for visually displaying the resultant product waves from which said higher frequency components have been removed.

11. Apparatus as set forth in claim 10, wherein said means for visually displaying said resultant waves includes a cathode ray tube indicator having vertical and horizontal deflection means and means producing a focused beam of electrons impinging on the screen thereof; said first product wave from which the high frequency components are removed being applied to said horizontal deflection means and said second product wave from which said high frequency components are removed being applied to said vertical deflection means.

12. Apparatus as set forth in claim 11, wherein the average phase delay characteristic of the signal transmission circuit to be tested is equal to $\tau/\omega$ and the linear phase-to-frequency characteristics of said first and second reference circuits is equal to $\tau/\omega$.

13. In combination, means for applying an input wave which varies cyclically in frequency to a network to be tested; means for deriving from the network signals indicative of the phase distortion introduced by the network to the components of the input wave; cathode ray tube indicator means including deflection means; and means for applying said signals to said deflection means for producing on the screen of said indicator means a display in polar form of the phase angle distortion introduced by said network.

References Cited in the file of this patent

UNITED STATES PATENTS

| | | |
|---|---|---|
| 2,481,644 | Callaway | Sept. 13, 1949 |
| 2,551,619 | McWhirter | May 8, 1951 |
| 2,722,659 | Dickey | Nov. 1, 1955 |
| 2,725,527 | McClure | Nov. 29, 1955 |
| 2,767,373 | Maggio | Oct. 16, 1956 |

OTHER REFERENCES

"Modulated-Beam Cathode-Ray Phase Meter," by Alan Watton, Jr., reprinted from Proceedings of I.R.E., vol. 32, No. 5, May 1944.

Bell System Tech. Journal, vol. 27, April 1948, pp. 247–264, article by Ring.

UNITED STATES PATENT OFFICE

Certificate of Correction

Patent No. 2,906,946 — September 29, 1959

Richard W. Sonnenfeldt

It is hereby certified that error appears in the printed specification of the above numbered patent requiring correction and that the said Letters Patent should read as corrected below.

Column 4, line 69, equation (13) should appear as shown below instead of as in the patent:

$$e_2 e_3 = e_H = k_1 E_3 \cos(\tau\omega - \theta_3)$$

line 72, equation (14) should appear as shown below instead of as in the patent:

$$e_1' = E_1' \cos(\omega t + \phi_1)$$

line 75, equation (15) should appear as shown below instead of as in the patent:

$$e_4 = E_4 \cos(\omega t + \phi_4)$$

column 5, line 3, equation (16) should appear as shown below instead of as in the patent:

$$e_3 e_4 = E_3 E_4 \cos(\omega t + \phi_4) \sin(\omega t + \phi_3)$$

line 5, equation (17) should appear as shown below instead of as in the patent:

$$e_3 e_4 = \tfrac{1}{2} E_3 E_4 [\sin(\phi_4 - \phi_3) + \sin(2\omega t + \phi_3 + \phi_4)]$$

column 5, line 11, equation (18) should appear as shown below instead of as in the patent:

$$e_3 e_4 = \tfrac{1}{2} E_3 E_4 \sin(\phi_4 - \phi_3)$$

Signed and sealed this 12th day of April 1960.

[SEAL]

Attest:
KARL H. AXLINE,
*Attesting Officer.*

ROBERT C. WATSON,
*Commissioner of Patents.*